US008373576B2

(12) United States Patent
Strohm

(10) Patent No.: US 8,373,576 B2
(45) Date of Patent: Feb. 12, 2013

(54) WIRELESS SENSOR NETWORK WITH VARIABLE PRIORITY

(75) Inventor: Charles Fred Strohm, Jenks, OK (US)

(73) Assignee: Murphy Wireless, LLC, Tulsa, OK (US)

( * ) Notice: Subject to any disclaimer, the term of this patent is extended or adjusted under 35 U.S.C. 154(b) by 440 days.

(21) Appl. No.: 12/684,637

(22) Filed: Jan. 8, 2010

(65) Prior Publication Data

US 2010/0109853 A1    May 6, 2010

Related U.S. Application Data

(63) Continuation-in-part of application No. 12/425,829, filed on Apr. 17, 2009, now Pat. No. 8,289,184.

(51) Int. Cl.
*G08C 19/22* (2006.01)

(52) U.S. Cl. ............ 340/870.07; 340/539.1; 340/539.22

(58) Field of Classification Search ............ 340/870.07, 340/539.1, 539.22; 370/348, 401; 709/224
See application file for complete search history.

(56) References Cited

U.S. PATENT DOCUMENTS

| 6,124,806 | A | 9/2000 | Cunningham et al. | |
|---|---|---|---|---|
| 6,735,630 | B1 * | 5/2004 | Gelvin et al. | 709/224 |
| 6,784,802 | B1 | 8/2004 | Stanescu | |
| 6,901,066 | B1 * | 5/2005 | Helgeson | 370/348 |
| 7,061,398 | B2 | 6/2006 | Holmes et al. | |
| 7,091,854 | B1 | 8/2006 | Miao | |
| 7,119,676 | B1 | 10/2006 | Silverstrim et al. | |
| 7,142,107 | B2 * | 11/2006 | Kates | 340/539.1 |
| 7,492,726 | B2 | 2/2009 | Gandham et al. | |
| 7,936,264 | B2 * | 5/2011 | Kates | 340/539.22 |
| 7,982,602 | B2 * | 7/2011 | Kates | 340/539.22 |
| 7,986,701 | B2 * | 7/2011 | Kore et al. | 370/401 |
| 2003/0016142 | A1 | 1/2003 | Holmes et al. | |
| 2003/0025612 | A1 | 2/2003 | Holmes et al. | |
| 2005/0210340 | A1 | 9/2005 | Townsend et al. | |
| 2005/0213548 | A1 | 9/2005 | Benson et al. | |
| 2005/0275528 | A1 | 12/2005 | Kates | |
| 2006/0103534 | A1 | 5/2006 | Arms et al. | |
| 2007/0129011 | A1 | 6/2007 | Lal et al. | |
| 2007/0209865 | A1 | 9/2007 | Kokosalakis et al. | |
| 2007/0211681 | A1 | 9/2007 | Sun et al. | |
| 2008/0027586 | A1 | 1/2008 | Hern et al. | |
| 2008/0040509 | A1 | 2/2008 | Werb et al. | |
| 2009/0002134 | A1 | 1/2009 | McAllister | |
| 2009/0009340 | A1 | 1/2009 | Weaver et al. | |
| 2009/0088605 | A1 | 4/2009 | Ross et al. | |
| 2009/0119243 | A1 | 5/2009 | Yuan et al. | |
| 2009/0141899 | A1 | 6/2009 | Huang et al. | |

FOREIGN PATENT DOCUMENTS

| WO | WO 0070572 | 11/2000 |
|---|---|---|
| WO | WO 0101366 | 1/2001 |

* cited by examiner

*Primary Examiner* — Jean B Jeanglaude
(74) *Attorney, Agent, or Firm* — Fellers, Snider, Blankenship, Bailey & Tippens, P.C.

(57) ABSTRACT

A system for wirelessly monitoring a plurality of parameters is disclosed. A first remote transceiver is attached to at least one first sensor for monitoring one of the parameters and a second remote transceiver is attached to at least one second sensor for monitoring another of said parameters. The system includes a base station transceiver. The first and second remote transceivers reach periodically report normal operating conditions to the base station transceiver. The first remote transceiver reports abnormal sensor readings with no substantial delay after occurrence. The second remote transceiver reports abnormal sensor readings a predetermined length of time after occurrence.

12 Claims, 5 Drawing Sheets

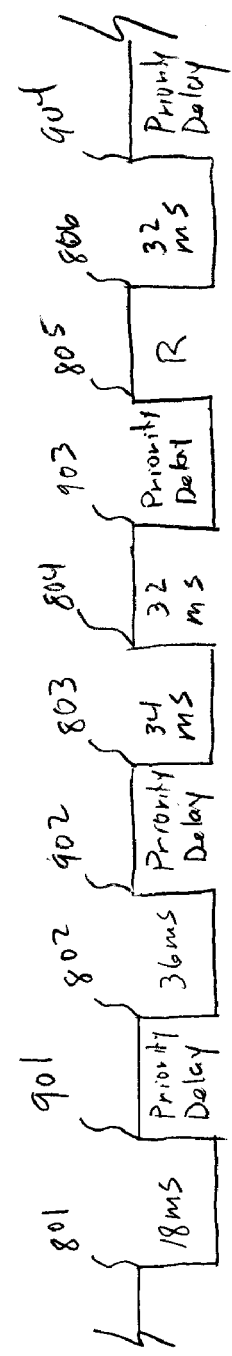

WIRELESS SENSOR NETWORK WITH VARIABLE PRIORITY

CROSS REFERENCE TO RELATED APPLICATIONS

This application is a continuation-in-part application of co-pending U.S. patent application Ser. No. 12/425,829, entitled "WIRELESS SENSOR NETWORK," filed Apr. 17, 2009, which claims the priority of U.S. Provisional Patent Application No. 61/092,228 entitled "WIRELESS SENSOR NETWORK," filed Aug. 27, 2008, the contents of which are hereby incorporated by reference.

FIELD OF THE INVENTION

This disclosure relates to wireless sensing networks in general and, more specifically, to wireless sensor networks operating in real time.

BACKGROUND OF THE INVENTION

Electronic control systems are utilized in a wide variety of applications requiring a rapid response time to various inputs. In some cases, the inputs may represent a binary input (i.e., on or off, presence of absence of a material, etc.) or may be a digital value or analog voltage representing a possible range of values (i.e., temperature, capacity, etc.)

The various inputs may be collected and provided to an engine controller or other device. The values collected may be the basis of computations or logical decisions resulting in adjustment of operating parameters or even activation or deactivation of various parts of the system. In the case of the engine controller, for example, there is a need for the sensor values to be collected very quickly since engines and the devices they power may be operating at high speed or under other extreme conditions.

One way to connect the various sensors to the engine controller or other logic device is by physically wiring the sensors to the device. The sensors may be wired on a common bus, for example, and be polled by the logic device. As might be imagined, one problem with this arrangement is physical wiring is required to travel from each sensor to the logic device. If new sensors are added, new wiring must also be added. Furthermore, physical wiring can be subject to damage from the elements, vibrations, etc.

What is needed is a system and method for addressing the above, and related, issues.

SUMMARY OF THE INVENTION

The invention of the present disclosure, in one aspect thereof, comprises system for wirelessly monitoring a plurality of parameters. A first remote transceiver is attached to at least one first sensor for monitoring one of the parameters and a second remote transceiver is attached to at least one second sensor for monitoring another of said parameters. The system also includes a base station transceiver.

The first and second remote transceivers reach periodically report normal operating conditions to the base station transceiver. The first remote transceiver reports abnormal sensor readings with no substantial delay after occurrence but the second remote transceiver reports abnormal sensor readings a predetermined length of time after occurrence. The system may also include a third remote transceiver that reports abnormal sensor readings a second predetermined length of time after occurrence.

The invention of the present disclosure, in another aspect thereof comprises a method including providing a plurality of remote transceivers that monitor one or more parameters, providing a base station transceiver, and providing at least two priority levels, each priority level having at least one remote transceiver assigned thereto.

The plurality of remote transceivers each periodically establishes communication with the base station transceiver to report nominal operating condition. Upon detecting an abnormal parameter reading, the plurality of remote transceivers delay a predetermined length of time before attempting to establish communication with the base station transceiver, the delay being shorter for a remote transceiver assigned a higher priority that that or a remote transceiver assigned a lower priority.

BRIEF DESCRIPTION OF THE DRAWINGS

FIG. 9 is a timing diagram illustrating possible placements of priority delays within the failsafe routine of FIGS. 8A-8B

DETAILED DESCRIPTION OF THE PREFERRED EMBODIMENTS

Figure 1:
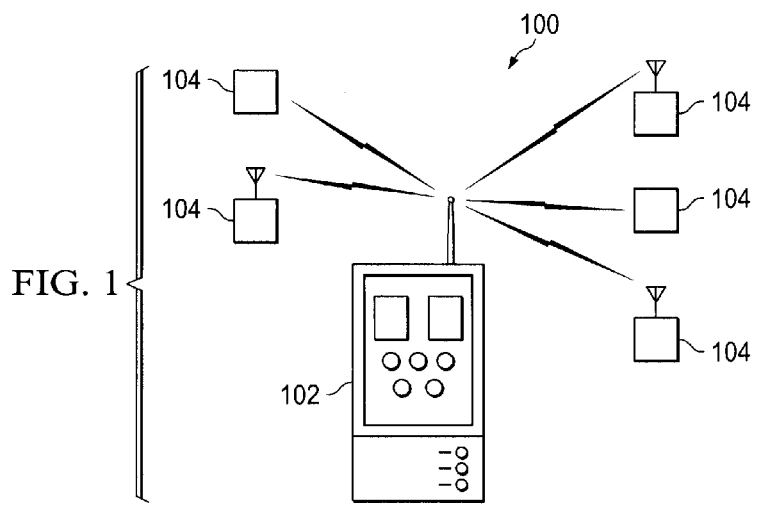
FIG. 1 is a diagram of the network topology of the system of the present disclosure.

Referring now to FIG. 1, a diagram of the network topology of the system of the present disclosure is shown. In the present embodiment, the system 100 comprises a hub 102 in selective communication with a number of remotes 104. It can be seen that the present embodiment employs a "star" network topology with a single hub 102 in communication with a plurality of remotes 104. In the present embodiments, the hub 102 and remotes 104 communicate wirelessly. In one embodiment, frequency shift keying (FSK) or Gaussian Frequency Shift Keying (GFSK) will be utilized on the 900 mHz or 2.5 gHz industrial, scientific and medical (ISM) band. Frequency Hopping Spread Spectrum (FHSS) or Direct Sequence Spread Spectrum (DSSS) may also be utilized to increase the reliability of the system 100. In the present embodiment, each of the remotes 104 selectively communicates with the hub 102, and all communication occurs via and through the hub 102. Therefore, in the present embodiments, the remotes 104 do not communicate directly with each other.

Figure 2:
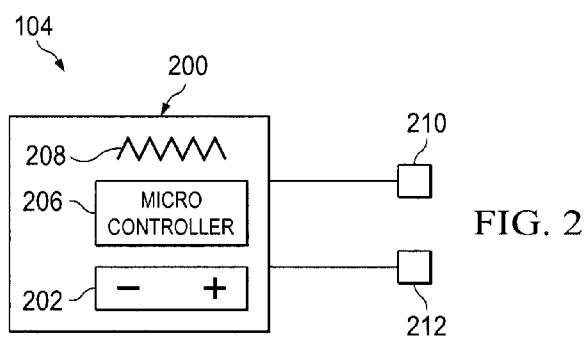
FIG. 2 is a schematic diagram of a remote transceiver with attached sensors.

Referring now also to FIG. 2, a schematic diagram of a remote transceiver with attached sensors is shown. The remote 104 illustrated in FIG. 2 may be constructed based on a printed circuit board 200. In some embodiments, an enclosure will also be provided (not shown in FIG. 2) or the remote 104 may be entirely contained within a sensor. A power supply 202 may also be provided to allow for untethered remote operation. In one embodiment, the power supply 202 will be a replaceable battery. However, rechargeable batteries or other power supplies could also be used in the present embodiment. A micro controller 206 implements and controls the functions and operations of the remotes described herein in the present embodiment. The micro controller 206 can be a general purpose micro processor programmed according to the needed functionality, but could also be an application-specific integrated circuit (ASIC), a field programmable gate array (FPGA), or other computational device.

The embodiment of FIG. 1 provides an internal antenna 208 that is situated directly on the printed circuit board 200. This allows the remote 104 to be completely enclosed within an enclosure for increased durability and/or resistance to the elements. However, in some cases, and as is shown in FIG. 1, the remote 104 has an external antenna in order to increase the reception or broadcast range of the remote. In the present embodiment, the remote 104 of FIG. 2 interfaces with two sensors 210 and 212. It is understood that, in some cases, a remote may interface only with a single sensor, or may have two or more sensors attached. The sensors 210, 212 may be discreet digital input sensors and/or analog type sensors. Based on the sensor 210, 212 and the programming of the micro controller 206, a sensor event can occur by either a discreet input state change and/or by an analog input falling out of bounds.

With regard to the remote 104 as shown in FIG. 2, it is also understood that other electronic devices may be included with the sensor, placed in the enclosure, or attached to the printed circuit board 200. These devices may provide functionality for carrying out such duties as recharging the battery 202, signal conditioning and/or amplification for the inputs from the sensors 210, 212, and other functions not carried out by the micro controller 206.

Figure 3:
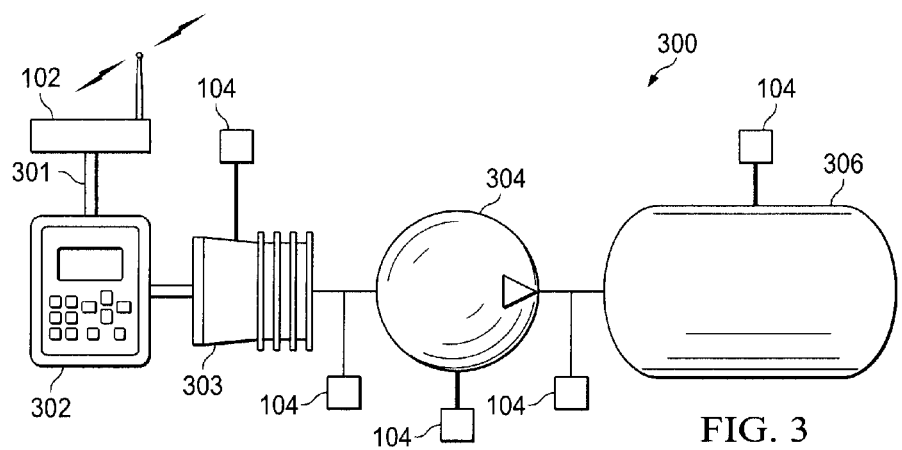
FIG. 3 is a schematic diagram of one embodiment of the system of the present disclosure in conjunction with a compressor system.

Referring now to FIG. 3, a schematic diagram of one embodiment of the system of the present disclosure is shown in conjunction with a compressor system. Here, the hub 102 is shown in a slightly different form factor from that shown in FIG. 1. The hub 102 of FIG. 3 is connected via a MODBUS 301 to an electronic engine controller 302. Although a MODBUS communications interface 301 is used in the present embodiment, it is understood that other interfaces could also be utilized. The hub 102 is also shown as a separate piece of equipment from the engine controller 302, but in some embodiments the two components could be enclosed in the same housing or even operated on the same hardware.

The engine controller 302 is responsible for operation of the engine 303. The engine controller 302 may be a Centurion or Millennium engine controller from FW Murphy, or another controller. The engine 303 may be electric, air powered, or may be an internal combustion engine that provides power for a compressor 304. Various parameters regarding the operation of the engine, including but not limited to temperature, engine speed, engine load, fuel level, and compression may be needed by the engine controller 302 to properly operate the engine 303. Therefore, one or more remotes 104 may be connected as shown, or in other configurations, to the engine 303 and/or its connection to the compressor 304.

The compressor 304 may be a gas compressor or other machine, such as a pump, deriving its power from the engine 303. The compressor 304 may also have a remote 104 connected thereto in order to monitor compressor parameters such as displacement, volume, and/or compression, among others. The output from the compressor 304 leading to the tank 306 may also be provided with a remote 104. Similarly, the pressure, volume, or other parameters relating to the tank 306 may be monitored by another attached remote 104.

As described previously, the remotes 104 may each selectively communicate with the hub 102. Likewise, the hub 102 may communicate back with the various remotes 104. In this manner, it can be seen that the hub 102 and remotes 104 each have transceiving capabilities. In the present embodiment, the 900 MHz or 2.5 GHz ISM band will be used, but in other embodiments other available frequency or spectra could be utilized. The remotes 104 and hub 102 may communicate by digital methods such as frequently shift keying or other encoding schemes. Spread spectrum techniques (FHSS, DSSS) may be utilized to increase reliability of the system 300.

As described, the sensors 104 may each monitor one or more parameters according to a digital or analog sensor interconnected with the system 300. However, in some cases, a relatively long period of time may pass before a sensor event is recorded or transmitted by the remotes 104. The present embodiment provides for "heart beat" monitoring to address this and other issues. In the present system, each of the remotes 104 will periodically transmit a "heart beat" signal to the hub 102. This allows the hub 102 to ensure that a remote is operational, even though no sensor event is being reported. A length of time since the last "heart beat" from a given remote that is determined to be outside operational requirements 104 may itself be cause to take action, as it could be a sign that the remote 104 has lost power and/or malfunctioned.

When not actively transmitting, the remotes 104 may be operated in a low power state. The low power state may be sufficient to allow for monitoring of any attached sensors while still conserving power by powering down transceiving functions.

If an actual event or sensor failure is detected by the remote and transmitted to the hub 102, such information may be communicated to the engine controller 302 via the MODBUS 301 in order to allow the engine controller 302 to take appropriate action. For example, if a failure of the compressor 304 is detected by one or more of the remotes 104, this information may be communicated to the hub 102 and passed on to the engine controller 302. In this example, the engine controller 302 may shut down the engine 303 to prevent further damage to the compressor 304. In another example, a low pressure indication in the tank 306 may signal the engine controller to activate the engine 303 and the compressor 304. A high reading of pressure from the tank 306 may cause the engine controller 302 to lower engine speed or stop the engine 303.

Figure 4A:
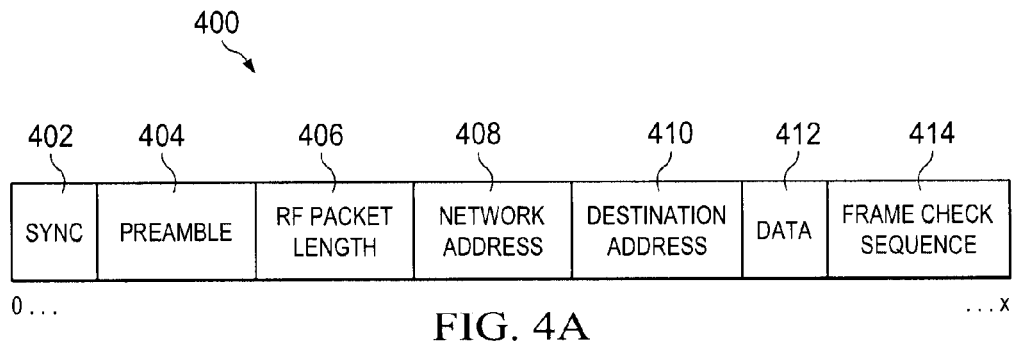
FIG. 4 is an illustration of a data packet format.

In some embodiments, the communication between the remotes 104 and the hub 102 may be a packet based communication. Referring now to FIG. 4, an illustration of an exemplary data packet format is shown. It is understood that the data packet 400 is merely an example and other packet formats based on known protocols or protocols created specifically for the system of the present disclosure could also be utilized. In the present example, the packet 400 is a Level 1 Data Driver Level packet. It can be seen that the packet 400 comprises a number of bits labeled 0 through X. In this case, X is the total number of bits in a fixed width packet.

A sync field 402 may be provided that may be a series of alternating zeros and ones allowing for the receiver of the packet 400 to obtain a lock on the wireless signal. In this embodiment, the sync field may be thought of as a training sequence for the receiving transceiver. This may allow the built in clock recovery circuit of the transceiver to recover the clock signal necessary to decode the remainder of the packet 400. Following the sync field 402 may be a preamble 404 to indicate the start of the actual data in the packet. Following the preamble 404 in the present embodiment is an RF packet length field 406. This field identifies the number of valid data bytes in the packet 400.

In some embodiments, the packet 400 will also contain a network address field 408. This may be used to identify the network to which the data packet 400 belongs. In this way, if the transceiver encounters a packet having an incorrect network address, it may be discarded. This allows multiple systems to operate within the same vicinity. Similarly, a destination address field 410 may be utilized to identify the actual transceiver that is the intended recipient of the data packet 400. Using a combination of the network address field 408 and the destination address field 410, each transceiver within the system 300, whether it is the hub 102 or one of the remotes 104, can engage in communications.

A data field 412 will contain the actual command or information sent in the packet 400 to or from the associated transceiver. If the packet 400 is being sent by a remote 104, the command or data could correspond to a sensor reading or an alarm condition, for example. Finally, a frame check sequence field 414 may be provided to confirm that the data packet has been transmitted without being corrupted. In one embodiment, the frame check sequence may be based upon a cyclic redundancy check or another method of error detection and/or correction.

Figure 4B:
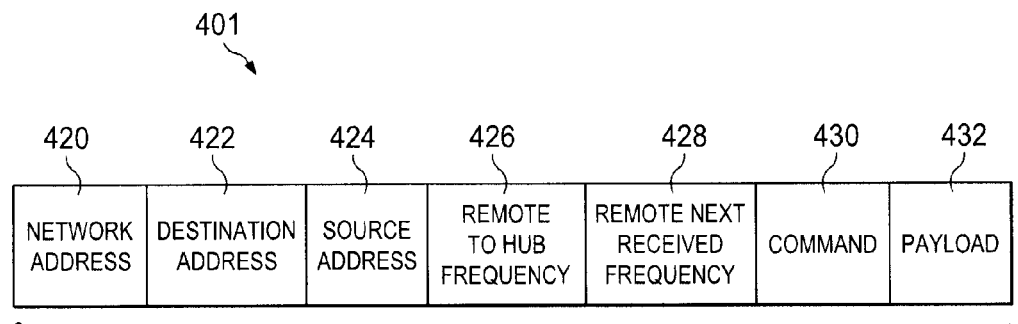

Referring now to FIG. 4B, a Level 2 Data application level packet 401 is illustrated. In the present embodiment, this application level data packet 401 may be based upon the data field and other fields contained in the Level 1 or driver level packet 400. As can be seen, the packet 401 comprises a plurality of fields and will be a specified number of bits long, labeled 0 through X on the packet 401. On the application level, a network address field 420 is provided, as is a destination address 422 and a source address 424. However, on the application level, the data packet 401 may also be said to contain a remote to hub frequency field 426. In the present embodiment, this field is used by the hub to calculate a time delay before replying to the remote when the remote is transmitting on all available channels. The remote's next received frequency may be identified in the remote next received frequency field 428. A command field 430 may be provided that identifies to the receiving transceiver how a payload field 432 is to be processed. The Level 1 packet 400 and the Level 2 packet 401 in the previous figures together illustrate one method of packetizing data and communications between the transceivers, or between the hub 102 and the various remotes 104. It is understood that this is only exemplary and that many other packetizing systems could be utilized. Furthermore, it is possible that packets used on both Level 1 and Level 2 could contain fields not shown in FIGS. 4A and 4B or may not contain all those fields that are shown.

Figure 5:
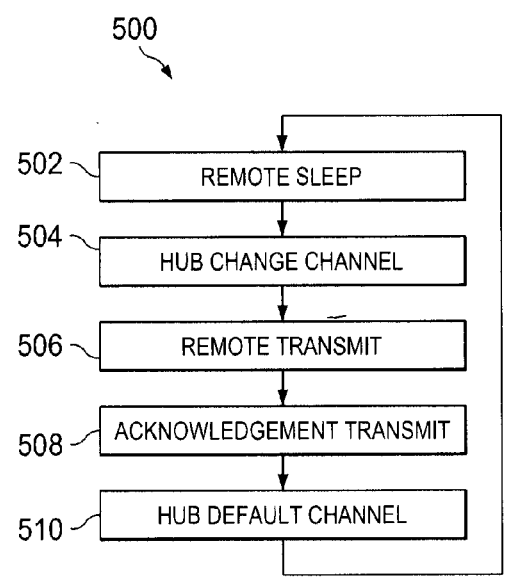
FIG. 5 is a flow diagram illustrating normal operations for one embodiment of remote according the present disclosure

Referring now to FIG. 5, a flow diagram illustrating normal operations for one embodiment of a remote according to the present disclosure is shown. During normal operation, the remote may be in a sleep or low power state 502. When a remote is in a sleep state, the associated hub will have its transceiver set to a default channel. A hub can be programmed with more than one default channel and may select the appropriate one based upon extant RF conditions in the operating area.

Before the associated remote changes from a sleep state, the hub will change to the channel associated with the particular remote at step 504. At step 506, the remote will transmit the data packet corresponding to the current event one or more times and then return to a receive mode. In one embodiment, the hub will know which channel to monitor for the transmission from the remote because it will have previously sent information to the remote indicating which channel and time to transmit on. In turn, the hub will know the correct channel to return an acknowledgement based upon the data received from the remote.

At step 508, the hub will transmit an acknowledgement (ACK). The acknowledgement packet may be transmitted a number of times and may also contain a hub-determined transmit and receive channel that will be used by the remote for the next transmission based upon the frequency hopping spread spectrum pseudo random channel scheme. Following the transmittal at step 508, the hub will return to the default channel at step 510. Following this, the remote may return to a sleep state at step 502, and wait for the next transmittal event.

As previously described, not every packet transmittal from a remote will correspond to a sensor event. For example, in the flow diagram just described, both the remote and hub must both already be aware of the time and channel in order for the hub to adjust to the correct channel at step 504. Thus, the flow diagram 500 may be thought of as illustrating the normal operation for a remote reporting a "heart beat" packet. However, in the event of a data packet being generated and sent based upon a sensor event, the event must be received within a time period supporting real time operation. Since the remotes 104 communicate with the hub 102 wirelessly, the possibility exists that the RF packet reporting of the event will not be received by the hub. Thus, the remote may need to re-transmit the packet to the hub until the hub acknowledges receipt. In one embodiment, a number of fail safe steps may be implemented to ensure the proper throughput of data on the RF channels.

It will be appreciated that, in the event of an actual sensor event, the remote may inform the hub by transmitting on the default channel. The corresponding data packet may be transmitted a number of times and may include the channel upon which the remote will be listening for an acknowledgement from the hub. The acknowledgement may also contain the next set of transmitted receive channels to be utilized by the remote. However, the communication may not always go according to plan, which will lead to implementation of the fail safe operation.

Figure 6:
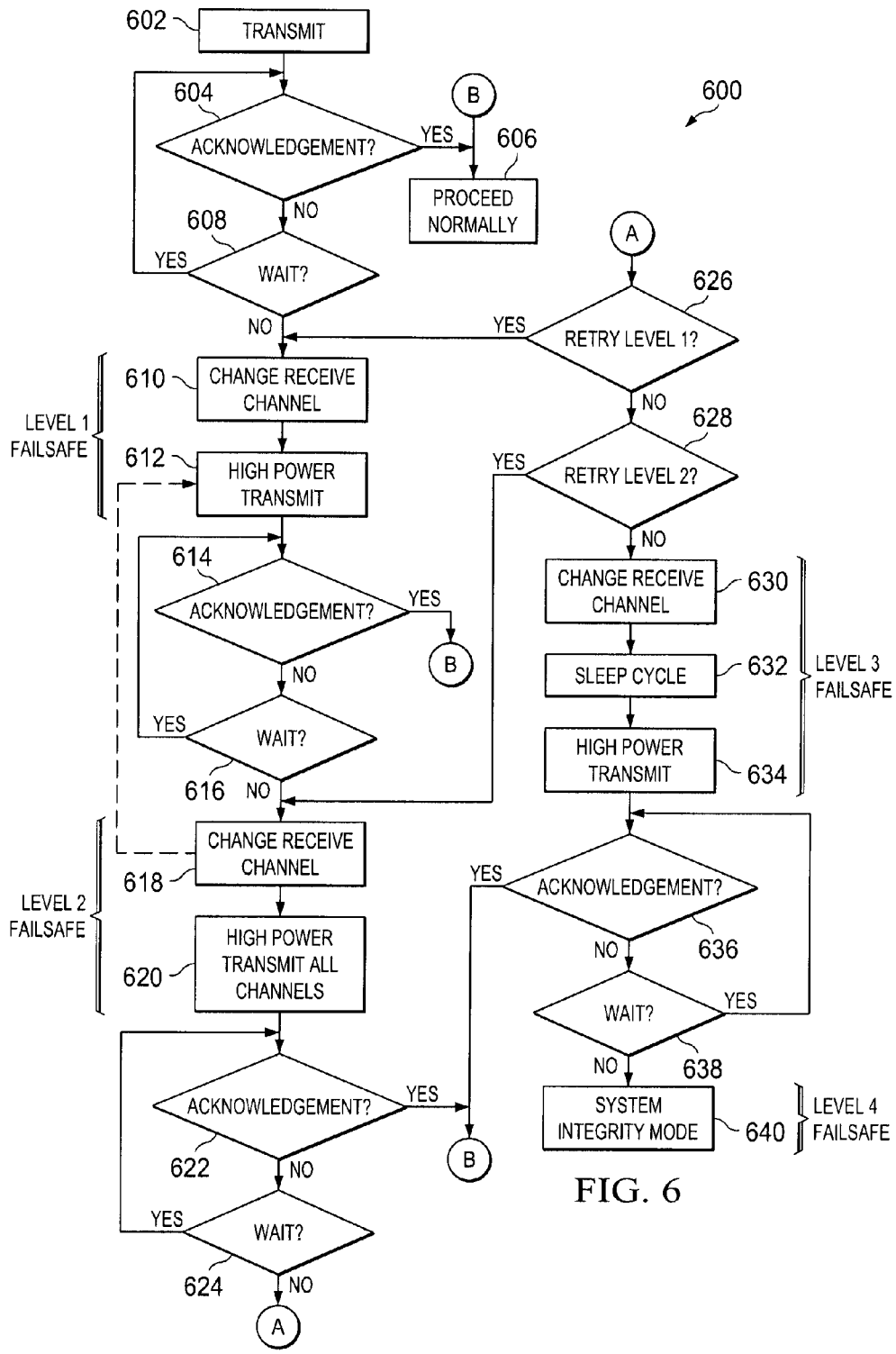
FIG. 6 is a flow diagram illustrating a fail safe mode of operation for one embodiment of a remote according to the present disclosure.

Referring now to FIG. 6, a flow diagram illustrating a fail safe mode of operation for one embodiment of the system of the present disclosure is shown. At step 602, a data packet is transmitted from a remote to the hub. For the present example, assuming this is in response to a sensor event, following transmission of the packet at step 602, the remote will initiate a time-out sequence. The purpose of the time-out sequence is to wait for receipt of an acknowledgement packet (ACK) from the hub, as shown at step 604. If the acknowledgement is received at step 604, then at step 606 the sequence proceeds normally, as illustrated in the previous flow diagram. In the event that an acknowledgement is not received at step 604, the remote will continue to wait at step 608 so long as a predetermined time limit has not passed.

When the determination has been made that it is no longer feasible to continue waiting for the acknowledgement, at step 608 the process will proceed to a Level 1 Failsafe comprising steps 610 and 612 as shown in the flow diagram. At step 610, the remote may change its receive channel to the next channel in the frequency hopping spectrum pseudo random sequence. This may be to attempt to overcome interference on the current channel. The information corresponding to the next channel is available to both the hub and the remote because the data is contained in the packet originally transmitted by the remote to the hub. At step 612, the remote may transmit on high power and will retransmit the original packet, possibly at high power. The remote may transmit the packet to the hub a number of times at this step. Following this, the remote will return to its default power state and wait, as shown in steps 614 and 616, to determine whether the acknowledgement is received. If the acknowledgement is received at step 614, the procedure will return to normal at step 606. If the acknowledgement is not received at step 614, at step 616 the decision is made as to whether or not the remote will continue to wait to receive the acknowledgement.

At some point, if the acknowledgement is never received and the decision is made at step 616 not to wait any longer, the remote will move to a Level 2 Failsafe comprising steps 618 and 620. At step 618, the remote may change its receiver channel to the next channel in the FHSS pseudo random sequence (or in the DSSS). In some embodiments, the Level 1 Failsafe technique may be retried, as illustrated by the dotted line from step 618 to step 612. In this embodiment, the high power transmission technique may be tried on the default channel one or more additional times. However, in the present embodiment, following the changing of the channel at step 618, the remote may change to a high power transmission mode and may transmit the data packet on all available channels at step 620. In some embodiments, a plurality of predetermined channels may be used less than all the available channels. This is in contrast to the level one technique of transmitting at high power on the default channel.

Following transmission of the data packet at high power on all channels at step 620, the remote will once again power back to its default mode and begin the time-out sequence that includes waiting for the acknowledgement at steps 622 and 624. If, at step 622 an acknowledgement is received, then control resumes normally at step 606. However, if the acknowledgement is not received within a sufficient period of time, the decision may be made at step 624 to move to the decision at step 626 as to whether or not to retry the Level 1 Failsafe. If, at step 626 the Level 1 Failsafe if retried, then the procedure is started again at step 610. If the decision is made at step 626 not to retry Level 1, retrying Level 2 may also be considered at step 628. If Level 2 is to be retried, flow control returns to step 618.

If the decision is made to retry neither Level 1 nor Level 2, then control may proceed to a Level 3 Failsafe mode. If the technique reaches this point, it means that there was no acknowledgement received from the hub after trying various modes of communication. Once again, at step 630, the receive channel may be changed. A delay cycle for a specified period of time may be initiated at step 632 to allow RF conditions to improve or another high power transmit technique may be tried at step 634. After the predetermined delay cycle of step 632, followed by the high-power transmission sequence of step 634, the remote will await an acknowledgement at steps 636 and 638. If, at step 636, acknowledgement is received, control proceeds normally at step 606.

If the decision is made at step 638 not to continue waiting for the acknowledgement, then control proceeds to a system integrity mode at step 640. The system integrity mode may contain additional steps and procedures to continue to attempt to communicate and receive acknowledgement from the hub at the remote. This step may be designed based upon how critical the remote is to system performance.

Figure 7:
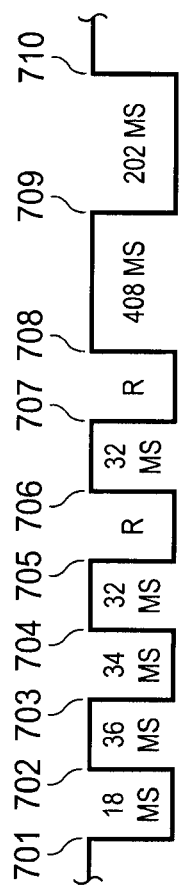
FIG. 7 is a timing diagram illustrating one method of implementing a failsafe routine for heartbeat communications according to the present disclosure.

FIG. 7 is a timing diagram illustrating one method of implementing a failsafe routine for heartbeat communications according to the present disclosure. This or a similar method may be utilized at one or more of the various failsafe levels described above. Each time a remote of the present system transmits a heartbeat packet, the channel that the remote itself is listening will be incremented to the next channel is its rotation. The information corresponding to the channel sequence for the remote is also transmitted to the hub in each heartbeat packet. In this way, if the listening channel becomes blocked or otherwise subject to unacceptable interference, the remote and the hub will both be able to utilize the next listening channel.

At event 701 the remote wakes up. In the present example, the wakeup corresponds to a timed event indicating that the next heartbeat packet should be transmitted to the hub. It will be appreciated that the present system provides a mechanism (for heartbeat transmissions or event related transmissions) for the remotes of the present system to initiate communications with the hub. This circumvents the need for a polling system or a strictly timed system. Among other benefits, this leads to lower power consumption and greater flexibility.

A warm-up delay of about 36 ms before the remote starts transmitting may be present as shown at event 702. At 703 the heartbeat packet is transmitted. Event, 704 marks the beginning of a 32 ms timeout period. In some embodiments, under ideal conditions an acknowledgement from the hub can be expected 11-12 ms into the 32 ms timeout period. If no acknowledgement is received, a high priority channel is used to transmit the heartbeat packet at step 705. In the present embodiment, a delay period of between 22 and 52 ms passes between events 705 and 706. However, another timeout of about 32 ms will begin at step 706. A second high priority channel may be tried at step 707, followed by another random delay of 22-52 ms, and another 32 ms timeout at step 708.

If no acknowledgement has been received up to this point, a much longer timeout may be utilized before proceeding to the next step. Thus, in FIG. 7, a 408 ms timeout is shown between events 708 and 709. Step 709 is a transmit sweep where the heartbeat packet is transmitted across a plurality of channels. The channels chosen may be random, may include all available channels, or may be a set of channels selected to provide the greatest chance for success. Regardless of which channel, if any, is ultimately successful in reaching the hub, a minimum reply time would once again be 11 ms into the timeout period. However, a longer delay period of about 202 ms may be used at 710 before further steps may be tried, or it may be considered that a catastrophic failure has occurred.

It will be appreciated that the methods and systems of the present disclosure may be employed to deal with breakdowns in equipment and communications ranging from simple transient interference through complete failure of one or more subsystems. However, in some embodiments, specific methods may be employed to deal with major interference across one or more communications channels, particularly when it is known that interference is the actual problem. The transceivers (hub or remotes) may be able to determine a priori that communication is likely failing due to major interference on a specific channel.

If it is determined (by the hub, remote, or both) that major interference on the high priority channel is preventing its use, the second high priority channel may be employed. This can occur in the context of a heartbeat communication and/or an event notification. In some cases, multiple channels may be subject to major interference, rendering them essentially unusable. It may be necessary for a number of channels to be attempted before communication can occur at a satisfactorily high quality level. If the first and second high priority channels are both unusable owing to interference, other channels may be tried on the FHSS sequence. However, it may be favorable to return to the initial designated high priority channel whenever feasible. For this reason, the original high priority channel may be retried periodically. A transmission need not necessary be attempted to retry the channel as it may be possible to determine the degree of interference on the channel by listening only. If or when the original channel become usable (i.e., the disturbance causing the interference has ended or passed) the hub and remotes may return to the initial high priority channel for high priority communications.

Figure 8A:
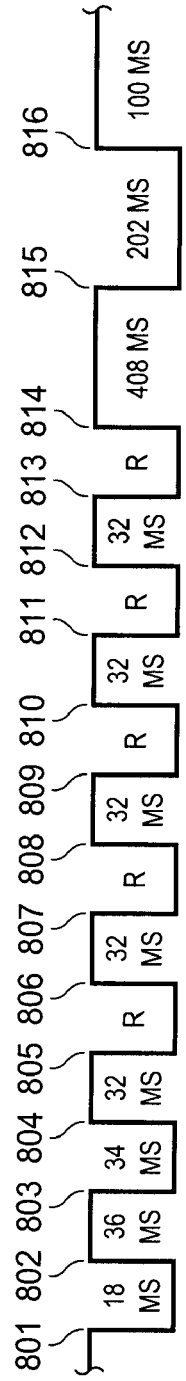
FIGS. 8A and 8B are two timing diagrams corresponding to one method of implementing a failsafe routine for sensor event communications according to aspects of the present disclosure.
Figure 8B:
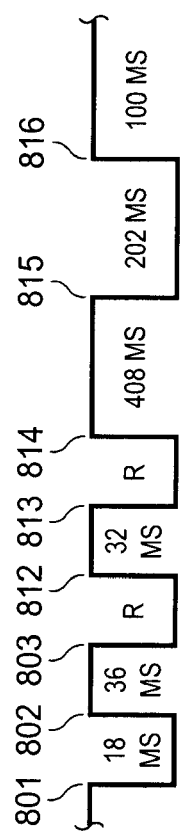

FIGS. 8A-8B are two timing diagrams corresponding to one method of implementing a failsafe routine for sensor event communications according to aspects of the present disclosure. This or a similar method may be utilized at one or more of the various failsafe levels described above. Each time a remote of the present system transmits a sensor event packet, the channel that the remote itself is listening will be incremented to the next channel is its rotation. The information corresponding to the channel sequence for the remote is also transmitted to the hub in each sensor event packet. In this way, if the listening channel becomes blocked or otherwise subject to unacceptable interference, the remote and the hub will both be able to utilize the next listening channel.

FIG. 8A indicates a possible first step that is followed by a remote that has detected a reportable sensor event. Following a wakeup at event 801 and a warm-up delay at event 802, the routine generally is to transmit on a high priority channel as shown by event 803. A timeout is taken at 804 to allow time for the response from the hub. A best-case scenario on the response time is 11-12 ms so the delay is about 32 ms to allow for adequate time to receive an acknowledgement. If no acknowledgement is received, a second high priority channel is tried as shown at event 805. A random delay of between 22 and 52 ms occurs next followed by a programmed timeout of 32 ms at event 806.

This general process described above may repeat a total of three times, meaning that a high priority transmit will have been tried a total of six times. A high priority first channel transmit may occur again at 807, followed by a random delay, then a timeout at event 808. The second high priority may be tried again at 809, followed by a random delay, then a timeout at event 810. Finally, the first high priority channel may be tried again at 811, followed by a random delay, and a timeout at 812. The second high priority channel may be tried a final time at step 813, followed by the random delay, then a timeout at event 814. However, this last timeout is much longer and may last for about 408 ms. Following the 408 ms timeout at event 814, a transmission of the sensor event packet will be tried on all available channels at 815. Following this, a timeout period of about 100 ms may begin at event 816.

In the event that the process shown in FIG. 8A is ultimately unsuccessful, the failsafe mode of FIG. 8B may be employed. In contrast to the mode of FIG. 8A, the failsafe mode of FIG. 8B may repeat until an acknowledgement is received, or the remote enters a low power mode on the assumption that no acknowledgement is going to be received. It can be seen from FIG. 8B that an abbreviated process may be used for the failsafe mode. A wakeup at event 801 and a delay at event 802 may be present. At event 803, the first high power transmit channel may be utilized, followed by a random 22-52 ms delay, and a timeout period of 32 ms at event 812. Event 813 shows the second high power channel being utilized, followed by the random delay, and the timeout of event 814. The timeout of 814 is 408 ms, followed at event 815 by a high power transmit on all channels event. A 100 ms timeout follows at event 816, whereupon the process may repeat, starting at event 801.

The various random delays referenced above are related to network traffic when multiple remotes 104 are utilized with a single hub 102—as will often be the case. When a packet is sent from the remote 104 to the hub 102, it is possible that the channel on which the remote 104 is expecting a reply from the hub 102 is blocked. Given this possibility, the remote 104 changes its receive channel each time a packet is sent to the hub 102. This is important when the remote 104 re-transmits a packet to the hub 102. This delay is important in the event two or more remotes 104 try to transmit at the same time. By randomizing delays the remotes 104 are prevented from continually interfering with one another, which could lead to system failure.

In another embodiment, the various remotes may be assigned to one of a number of priority levels. In some embodiments, two levels will be used (e.g., high and low, or high and normal). However, a tiered priority structure could be used where three or more priority levels are assigned. Remotes monitoring more critical functions or aspects (of the system 300 of FIG. 3, for example) could be assigned higher priorities. To ensure that higher priority remotes' messages are processed first, lower priority remotes may be assigned a predetermined delay time after waking but before transmitting in response to an event. In this case, an event triggering multiple remotes simultaneously will not overload the hub 102 or cause interference when data is transmitted.

Referring now to FIG. 9, an adaptation of the routines of FIGS. 8A-8B incorporating a priority based delay are shown. FIG. is adapted specifically from the diagram of FIG. 8A but it is understood that priority delays may be utilized with any of the communications methods of the present disclosure. A wakeup event occurs at 801. In the present embodiment, an 18 ms delay time is utilized to allow the remote circuitry time to power up and prepare to transmit. This delay can be extended for remotes having lower priorities as shown by event 901. This will allow remotes with higher priorities to complete, or at least attempt, transmissions to the hub prior to attempted communications with the hub from the lower priority remotes. The delay time may be from a few milliseconds up to one or more seconds depending upon the criticality (or non-criticality) of the monitored parameter. The higher priority remote may have substantially no delay between waking for an event and transmitting its message (other than those necessary for proper function such as the warm-up delay).

FIG. 9 also illustrates other possible locations for priority delays. For example, a priority delay 902 may follow the programmed warm-up delay of 802. Following the response timeout 804, a priority delay may be utilized at 903. Similarly priority delays may follow other timeout periods such as timeout 806 followed by priority delay 904. Using one more priority delays at each stage of the failsafe routine may increase the amount of time needed to pass the parameter or message to the hub 102 but will facilitate the earliest possible arrival of messages from remotes with the highest priorities (and lowest delays).

It is also understood that extended delays could also be utilized at other times in order to give priority to certain remotes. For example, the random delay times could be purposely extended for remotes with lower priority. When there is difficulty in communication between the remotes and the hubs, this is likely to be happening for all the remotes. By extending the delay time for the lower priority remotes, it increases the chances that the higher priority messages will arrive before competition on the spectrum from lower priority messages begins.

It should also be noted that while the remote 104 is transmitting a sensor event packet, it tracks internally the number of times the packet has been transmitted. This data becomes part of the packet when transmitted so that the hub 102, and the user of the system, will be able to discern how many attempts were required before hub 102 was alerted to the sensor event. Information concerning the number of delays and time of delays (priority or random) may also be provided for performance monitoring and other purposes.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A system for event monitoring, comprising:
a remote sensor;
a remote transceiver interfaced to the remote sensor; and
a base transceiver that selectively wirelessly communicates with the remote transceiver;
wherein the remote transceiver provides a periodic communication to the base transceiver that is indicative of a nominal operating condition and the periodic communication is acknowledged by the base transceiver;
wherein the remote transceiver operates in a first fail safe mode when the periodic communication acknowledgement is not received by the remote transceiver, the first fail safe mode comprising changing a channel for receiving the acknowledgement and retransmitting the periodic communication at a higher power than the first transmission of the periodic communication;
wherein the remote transceiver selectively provides an event notification communication to the base transceiver that is indicative of the occurrence of a monitored event; and
wherein the remote transceiver delays a predetermined length of time between detecting the event and providing the event to the base transceiver.

2. The system of claim 1, further comprising:
a second remote transceiver that provides a periodic communication to the base transceiver that is indicative of a nominal operating condition and the periodic communication is acknowledged by the base transceiver;
wherein the second remotes transceiver selectively provides an event notification communication to the base transceiver that is indicative of the occurrence of a second monitored event; and
wherein the second remote transceiver delays a second predetermined length of time between detecting the second event and providing the second event to the base transceiver.

3. The system of claim 2, wherein the first remote transceiver has a higher priority and a shorter predetermined delay that the second remote transceiver that has a lower priority and a longer predetermined delay.

4. The system of claim 1, wherein the remote transceiver transmits on a high priority channel until detecting interference on the high priority channel and then switches to a second high priority channel for transmitting.

5. The system of claim 1, wherein, upon detecting interference, the base transceiver and the remote transceiver search for a channel with minimal interference across a frequency hopping spread spectrum group of channels.

6. A system for wirelessly monitoring a plurality of parameters, comprising:
a first remote transceiver attached to at least one first sensor for monitoring one of the parameters;
a second remote transceiver attached to at least one second sensor for monitoring another of the parameters; and
a base station transceiver;
wherein the first and second remote transceivers reach periodically report normal operating conditions to the base station transceiver and the periodic report is acknowledged by the base station transceiver;
wherein the remote transceivers operate in a first fail safe mode when the periodic communication acknowledgement is not received by the remote transceiver, the first fail safe mode comprising changing a channel for receiving the acknowledgement and retransmitting the periodic communication at a higher power than the first transmission of the periodic communication;
wherein the first remote transceiver reports abnormal sensor readings with no substantial delay after occurrence; and
wherein the second remote transceiver reports abnormal sensor readings a predetermined length of time after occurrence.

7. The system of claim 6, further comprising a third remote transceiver that reports abnormal sensor readings a second predetermined length of time after occurrence.

8. A method comprising:
providing a plurality of remote transceivers that monitor one or more parameters;
providing a base station transceiver; and
providing at least two priority levels, each priority level having at least one remote transceiver assigned thereto;
wherein the plurality of remote transceivers each provide a periodic communication to the base station transceiver to report nominal operating condition and the periodic communication is acknowledged by the base station transceiver;
wherein the plurality of remote transceivers each operate in a first fail safe mode when the periodic communication acknowledgement is not received by the remote transceiver, the first fail safe mode comprising changing a channel for receiving the acknowledgement and retransmitting the periodic communication at a higher power than the first transmission of the periodic communication; and
wherein upon detecting an abnormal parameter reading, the plurality of remote transceivers delay a predetermined length of time before attempting to establish communication with the base station transceiver, the delay being shorter for a remote transceiver assigned a higher priority that that or a remote transceiver assigned a lower priority.

9. The method of claim 8, further comprising assigning at least one remote transceiver to a highest priority level, the highest priority level having no predetermined substantial delay between detection of an abnormal parameter and attempting to establish communication with the base transceiver.

10. The method of claim 8, further comprising changing a communication channel of the remote transceiver and the bases station transceiver whenever a substantial amount of interference is detected on the communication channel.

11. The method of claim 10, wherein the changed channel is selected based on a frequency hopping spread spectrum basis.

12. The method of claim 10, further comprising monitoring the original communication channel and returning to it when the interference has subsided below a predetermined threshold.

* * * * *